US008509302B2

United States Patent
Hayase et al.

(10) Patent No.: US 8,509,302 B2
(45) Date of Patent: Aug. 13, 2013

(54) SCALABLE VIDEO ENCODING METHOD, SCALABLE VIDEO ENCODING APPARATUS, SCALABLE VIDEO ENCODING PROGRAM, AND COMPUTER READABLE RECORDING MEDIUM STORING THE PROGRAM

(75) Inventors: Kazuya Hayase, Yokosuka (JP); Yukihiro Bandoh, Yokosuka (JP); Seishi Takamura, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 172 days.

(21) Appl. No.: 13/123,690

(22) PCT Filed: Oct. 21, 2009

(86) PCT No.: PCT/JP2009/005512
§ 371 (c)(1),
(2), (4) Date: Apr. 11, 2011

(87) PCT Pub. No.: WO2010/047099
PCT Pub. Date: Apr. 29, 2010

(65) Prior Publication Data
US 2011/0194599 A1    Aug. 11, 2011

(30) Foreign Application Priority Data

Oct. 22, 2008 (JP) ................................ 2008-271513

(51) Int. Cl.
*H04N 7/12* (2006.01)
(52) U.S. Cl.
USPC .................................................. 375/240.02
(58) Field of Classification Search
USPC .......................................... 375/240.01, 240.2
See application file for complete search history.

(56) References Cited

U.S. PATENT DOCUMENTS 6,031,575 A    2/2000    Suzuki et al.
6,081,622 A    6/2000    Carr et al.
(Continued)

FOREIGN PATENT DOCUMENTS

CN    101047860 A    10/2007
CN    101129072 A    2/2008
(Continued)

OTHER PUBLICATIONS

Office Action, Chinese Patent Application No. 200980140627.4, Nov. 5, 2012.
(Continued)

*Primary Examiner* — David Czekaj
*Assistant Examiner* — Tracy Li
(74) *Attorney, Agent, or Firm* — Harness, Dickey & Pierce, P.L.C.

(57) ABSTRACT

In scalable video encoding, incidence rates of combinations of optimum prediction modes to be selected for spatially corresponding blocks of an upper layer and a lower layer are determined based on an optimum prediction mode that was selected in a conventional encoding, and then a correspondence table that describes relationships therebetween is created. Subsequently, the combinations of the selected optimum prediction modes described in the correspondence table are narrowed down based on the value of the incidence rate so as to create prediction mode correspondence information that describes the combinations of the optimum prediction mode narrowed down. When encoding the upper layer block, the prediction mode search candidate that is to be searched in the encoding is decided by referring to the prediction mode correspondence information using as a key the optimum prediction mode selected in the encoding of the spatially corresponding lower layer block and thereby reducing the number of the prediction mode search candidates.

7 Claims, 13 Drawing Sheets

(56) References Cited

U.S. PATENT DOCUMENTS

| | | | |
|---|---|---|---|
| 2006/0104354 A1 | 5/2006 | Han et al. | |
| 2007/0160137 A1* | 7/2007 | Guo et al. | ................ 375/240.1 |
| 2011/0261876 A1* | 10/2011 | Tan et al. | ................ 375/240.01 |

FOREIGN PATENT DOCUMENTS

| | | |
|---|---|---|
| JP | 09-322163 | 12/1997 |
| JP | 2005-184241 | 7/2005 |
| JP | 2006-033451 | 2/2006 |
| RU | 2 324 302 C1 | 5/2008 |
| WO | 2006/075240 A1 | 7/2006 |
| WO | 2007/063808 A1 | 6/2007 |
| WO | 2008/060262 A1 | 5/2008 |

OTHER PUBLICATIONS

Li, He, et al., "Fast Mode Decision Algorithm for Inter-Frame Coding in Fully Scalable Video Coding," IEEE Transactions on Circuits and Systems for Video Technology, vol. 16, No. 7, Jul. 2006, pp. 889-895.

Lim, Sunhee, et al., "Fast Coding Mode Decision for Scalable Video Coding," 10th International Conference on Advanced Communication Technology, Feb. 17-20, 2008, pp. 1897-1900.

Lee, Bumshik, et al., "A Fast Mode Selection Scheme in Inter-layer Prediction of H.264 Scalable Extension Coding," 2008 IEEE International Symposium on Broadband Multimedia Systems and Broadcasting, Mar. 31, 2008, pp. 1-5.

Ren, Jianfeng, et al., "Fast Adaptive Early Termination for Mode Selection in H.264 Scalable Video Coding," 15th IEEE International Conference on Image Processing, Oct. 12, 2008, pp. 2464-2467.

Kato, Sadaatsu, et al., "Hierarchical Mode Search with Classification of Bisectional Prediction Modes Based on the Position of Motion Boundary," 2004 International Conference on Image Processing, Oct. 24-27, 2004, pp. 485-488.

Shen, Liquan, et al., "Fast Inter Mode Decision Using Spatial Property of Motion Field," IEEE Transactions on Multimedia, vol. 10, No. 6, Oct. 2008, pp. 1208-1214.

T. Wiegand, G. Sullivan, J. Reichel, H. Schwarz and M. Wien, "Joint Draft ITU-T Rec. H. 264, ISO/IEC 14496-10/Amd.3 Scalable video coding", ISO/IEC JTC1/SC29/WG11 and ITU-T SG16 Q.6, JVT-X201, 2007. http://ftp3.itu.ch/av-arch/jvt-site/2007_06_Geneva/JVTX201.zip.

J. Reichel, H. Schwarz and M. Wien, "Joint Scalable Video Model JSVM-11", ISO/IEC JTC1/SC29/WG11 and ITU-T SG16 Q.6, JVT-X202, 2007. http://ftp3.itu.ch/av-arch/jvt-site/2007_06_Geneva/JVTX202.zip.

Hung-Chih Lin et al., "Layer-Adaptive Mode Decision and Motion Search for Scalable Video Coding with Combined Coarse Granular Scalability (CGS) and Temporal Scalability", IEEE International Conference on Image Processing (ICIP 2007), Sep. 16, 2007, vol. 2, pp. 289-292.

Kazuya Hayase et al., "Study on fast prediction mode decision of SVC", ITE Annual Convention 2008.

Seon-Tae Kim, "Fast Mode Decision Algorithm for Spatial and SNR Scalable Video Coding", IEEE International Symposium on Circuits and Systems (ISCAS 2009), May 24, 2009, pp. 872-875.

Decision on Grant, Russian Patent Application No. 2011114296, Mar. 1, 2013.

* cited by examiner

FIG. 3

| 8 × 8 SMB OPTIMUM PREDICTION MODE FOR LAYER L-1 | | OPTIMUM PREDICTION MODE FOR LAYER L | | | | | | | | | | |
|---|---|---|---|---|---|---|---|---|---|---|---|---|
| | | BLSkip | Skip | Direct | 16x16 | 16x8 | 8x16 | 8x8 | IntraBL | Intra16 | Intra8 | Intra4 |
| | BLSkip | 23.7% | 30.0% | 2.0% | 24.3% | 8.0% | 5.0% | 7.0% | 0.0% | 0.0% | 0.0% | 0.0% |
| | Skip | 19.5% | 56.1% | 1.2% | 18.8% | 2.2% | 1.6% | 0.7% | 0.0% | 0.0% | 0.0% | 0.0% |
| | Direct | 18.2% | 33.0% | 7.5% | 21.3% | 8.0% | 5.7% | 6.3% | 0.0% | 0.0% | 0.0% | 0.0% |
| | 16x16 | 21.4% | 32.3% | 2.4% | 25.1% | 8.1% | 6.2% | 4.4% | 0.0% | 0.0% | 0.0% | 0.1% |
| | 16x8 | 14.1% | 17.6% | 2.1% | 24.9% | 18.3% | 11.6% | 11.1% | 0.0% | 0.0% | 0.0% | 0.2% |
| | 8x16 | 13.3% | 15.6% | 2.4% | 22.8% | 12.8% | 17.2% | 15.4% | 0.0% | 0.0% | 0.1% | 0.4% |
| | 8x8 | 10.7% | 9.2% | 2.0% | 17.3% | 17.6% | 20.2% | 22.4% | 0.0% | 0.0% | 0.0% | 0.3% |
| | IntaBL | 0.0% | 0.0% | 0.0% | 0.0% | 0.0% | 0.0% | 0.0% | 100.0% | 0.0% | 0.0% | 0.0% |
| | Intra16 | 0.0% | 0.0% | 0.0% | 0.0% | 0.0% | 0.0% | 0.0% | 100.0% | 0.0% | 0.0% | 0.0% |
| | Intra8 | 0.0% | 0.0% | 0.0% | 0.0% | 0.7% | 0.7% | 0.0% | 98.7% | 0.0% | 0.0% | 0.0% |
| | Intra4 | 0.0% | 0.0% | 0.0% | 4.2% | 1.1% | 1.6% | 2.1% | 88.9% | 0.0% | 0.0% | 2.1% |

FIG. 4

| 8 × 8 SMB OPTIMUM PREDICTION MODE FOR LAYER L-1 | OPTIMUM PREDICTION MODE FOR LAYER L | | | | | | | | | | |
|---|---|---|---|---|---|---|---|---|---|---|---|
| | BLSkip | Skip | Direct | 16x16 | 16x8 | 8x16 | 8x8 | IntraBL | Intra16 | Intra8 | Intra4 |
| BLSkip | ○ | ○ | × | ○ | ○ | ○ | ○ | × | × | × | × |
| Skip | ○ | ○ | ○ | ○ | × | × | × | × | × | × | × |
| Direct | ○ | ○ | × | ○ | ○ | ○ | ○ | × | × | × | × |
| 16x16 | ○ | ○ | × | ○ | ○ | ○ | ○ | × | × | × | × |
| 16x8 | ○ | ○ | × | ○ | ○ | ○ | ○ | × | × | × | × |
| 8x16 | ○ | ○ | × | ○ | ○ | ○ | ○ | × | × | × | × |
| 8x8 | × | × | × | × | × | × | × | × | × | × | × |
| IntraBL | × | × | × | × | × | × | × | ○ | × | × | × |
| Intra16 | × | × | × | × | × | × | × | ○ | × | × | × |
| Intra8 | × | × | × | × | × | × | × | ○ | × | × | × |
| Intra4 | × | × | × | × | × | × | × | ○ | × | × | × |

FIG. 5

| 8 x 8 SMB OPTIMUM PREDICTION MODE FOR LAYER L-1 | OPTIMUM PREDICTION MODE FOR LAYER L | | | | | | | | | | |
|---|---|---|---|---|---|---|---|---|---|---|---|
| | BLSkip | Skip | Direct | 16x16 | 16x8 | 8x16 | 8x8 | IntraBL | Intra16 | Intra8 | Intra4 |
| BLSkip | x | O | x | x | x | x | x | x | x | x | x |
| Skip | x | O | x | x | x | x | x | x | x | x | x |
| Direct | x | O | x | x | x | x | x | x | x | x | x |
| 16x16 | x | x | x | O | x | x | x | x | x | x | x |
| 16x8 | x | x | x | O | x | x | x | x | x | x | x |
| 8x16 | x | x | x | x | x | x | x | x | x | x | x |
| 8x8 | x | x | x | x | x | x | O | x | x | x | x |
| IntraBL | x | x | x | x | x | x | x | O | x | x | x |
| Intra16 | x | x | x | x | x | x | x | O | x | x | x |
| Intra8 | x | x | x | x | x | x | x | O | x | x | x |
| Intra4 | x | x | x | x | x | x | x | O | x | x | x |

SCALABLE VIDEO ENCODING METHOD, SCALABLE VIDEO ENCODING APPARATUS, SCALABLE VIDEO ENCODING PROGRAM, AND COMPUTER READABLE RECORDING MEDIUM STORING THE PROGRAM

CROSS-REFERENCE TO RELATED APPLICATIONS

This application is a 371 U.S. National Stage of International Application No. PCT/JP2009/005512, filed Dec. 28, 2009.

TECHNICAL FIELD

The present invention relates to a scalable video encoding method and apparatus that scalably encode videos, and to a scalable video encoding program that is used to realize this scalable video encoding method, and to a computer readable recording medium storing the program. In particular, the present invention relates to a scalable video encoding method and apparatus that achieve a reduction in the encoding time, and to a scalable video encoding program that is used to realize this scalable video encoding method, and to a computer readable recording medium on which this program is stored.

Priority is claimed on Japanese Patent Application No. 2008-271513, filed Oct. 22, 2008, the contents of which are incorporated herein by reference.

BACKGROUND ART

Various display terminals and network environments have been developed in recent years. Because of this, the NT (Joint Video Team) has undertaken an examination of the SVC (Scalable Video Coding) encoding system which enables scalability of space/time/SNR (Signal to Noise Ratio) for AVC (Advanced Video Coding) (see, for example, Non-patent document 1).

In SVC, three prediction methods, namely, Inter prediction, Intra prediction, and Interlayer prediction are used, and redundancy elimination interposed between times, spaces, and layers is performed. Examples of prediction modes obtainable via SVC are given below.

[Inter Prediction]
  Skip mode (Skip)
  Direct mode (Direct)
  16×16 block size motion prediction mode (P16×16)
  16×8 block size motion prediction mode (P16×8)
  8×16 block size motion prediction mode (P8×16)
  8×8 block size motion prediction mode (P8×8)
[Intra Prediction]
  16×16 block size Intra prediction mode (I16×16)
  8×8 block size Intra prediction mode (I8×8)
  4×4 block size Intra prediction mode (I4×4)
[Interlayer Prediction]
  BLSkip mode (BLSkip)
  IntraBL mode (IntraBL)

When P8×8 is being performed, each 8×8 block can be further divided into 8×4, 4×4, and 4×4 block sizes. In SVC, one of these candidates for prediction mode search (prediction mode search candidates) is selected as the optimum prediction mode in each macro block.

An example of a method used to decide the optimum prediction mode is given below.

In JSVM (Joint Scalable Video Model: see, for example, Non-patent document 2) which is promoted by JVT as an SVC reference encoder, the encoding costs which are generated by the coding bit and encoding distortion are calculated in each prediction mode, and the prediction mode having the lowest encoding costs out of all the aforementioned prediction modes is determined to be the optimum prediction mode.

Moreover, in Patent document 1 given below, vectors are created by extrapolating or interpolating reference frame motion vectors in encoding subject frames, and the coordinates of each pixel in the macro-blocks that have moved as a result of this are then determined, and the number of times pixels coincide are counted for each pixel. Next, the prediction mode search candidates are narrowed down in accordance with the size of the value of a score which is calculated from the count number of each pixel within the encoding target macro-blocks. The method used for this narrowing down is one that was proposed in order to increase the speed of an H.264/AVC prediction mode search, however, it can also be applied in SVC which is a mechanism for the same prediction mode search as in H.264/AVC.

Moreover, in Patent document 2 given below, in order to make it possible to perform the intra-frame encoding at high-speed, for example, nine intra-frame prediction errors are determined in a block where intra-frame encoding is to be performed using the pixel values of adjacent encoding blocks and, based on these prediction errors, a prediction mode is decided for that block. Next, a prediction mode for that block is decided using the intra-frame prediction mode of an adjacent block that have already been encoded, and when the two prediction modes match, the prediction mode is selected as it is. If, however, the two prediction modes do not match, the prediction mode having the lower encoding costs is selected.

PRIOR ART

[Non-patent document 1] T. Wiegand, G. Sullivan, J. Reichel, H. Schwarz and M. Wien: "Joint Draft ITU-T Rec. H.264|ISO/IEC 14496-10/Amd.3 Scalable video coding, "ISO/IEC JTC1/SC29/WG11 and ITU-T SG16 Q.6, JVT-X201, 2007. http://ftp3.itu.ch/av-arch/jvt-site/2007_06_Geneva/JVTX201.zip

[Non-patent document 2] J. Reichel, H. Schwarz and M. Wien: "Joint Scalable Video Model JSVM-11," ISO/IEC JTC1/SC29/WG11 and ITU-T SG16 Q.6, JVT-X202, 2007. http://ftp3.itu.ch/av-arch/jvt-site/2007_06_Geneva/JVTX202.zip

[Patent document 1] Japanese Unexamined Patent Application, First Publication (JP-A) No. 2006-033451

[Patent document 2] Japanese Unexamined Patent Application, First Publication (JP-A) No. 2005-184241

DISCLOSURE OF THE INVENTION

Problems to be Solved by the Invention

In the JSVM method of deciding the optimum prediction mode described in Non-patent document 2, because there is no narrowing down of the prediction mode search candidates, a superior encoding performance can be achieved. On the other hand, in this deciding method, an enormous amount of time is needed to perform the prediction mode search. Namely, in this deciding method, considerable time is wasted because all prediction modes are searched even for prediction modes which clearly have a low probability of being selected if the characteristics of images within the macro-blocks are considered (for example, Intra mode prediction modes in static areas).

Moreover, because the narrowing down of the prediction mode search candidates in Patent document 1 is a method of determining whether or not to perform Intra mode prediction, it has no effect on reducing Inter prediction mode searches which require a longer calculation time compared to Intra prediction mode searches. Namely, considerable room for improvement remains when it comes to Inter prediction mode searches.

Moreover, because the narrowing down of the prediction mode search candidates of Patent document 2 is only an Intra prediction narrowing down, in the same way as the narrowing down of the prediction mode search candidates of Patent document 2, there is no effect on reducing Inter prediction mode searches. Namely, considerable room for improvement remains when it comes to Inter prediction mode searches.

The present invention was conceived in view of the above described circumstances and it is an object thereof to provide new scalable video encoding technology that, in scalable video encoding which achieves scalability by means of a layer structure, narrows down the upper layer prediction mode search candidates using correlations of optimum prediction modes between layers so as to achieve an improvement in speed.

Means for Solving the Problem

In scalable video encoding in which scalability is achieved by means of a layer structure, in order to achieve an increase in the speed of a prediction mode search, the scalable video encoding apparatus of the present invention includes: (1) a creating unit that, based on information about an optimum prediction mode that was selected in scalable encoding performed without any limits being placed on the usage of prediction modes defined as being able to be used, determines incidence rates of combinations of optimum prediction modes to be selected for spatially corresponding blocks of an upper layer and a lower layer, and creates a correspondence table that describes relationships between combinations of the selected optimum prediction mode and the optimum prediction mode to be selected, and the incidence rates; (2) an acquiring unit that, when encoding the upper layer block, acquires information about the optimum prediction mode selected in the encoding of the spatially corresponding lower layer block; (3) a deciding unit that, based on the information about the selected optimum prediction mode acquired by the acquiring unit and on the information about the incidence rates described in the correspondence table, extracts an effective combination from among the combinations described in the correspondence table, and decides the optimum prediction mode of the upper layer held by the extracted effective combination as the prediction mode search candidate to be searched in the encoding of the block of the upper layer; and (4) a control unit that performs control such that scalable encoding in which limits are placed on the usage of prediction modes executed using the correspondence table, and scalable encoding in which no limits are placed on the usage of prediction modes executed without using the correspondence table are repeated alternatingly.

In a structure such as that described above, by referring to the correspondence table using as a key the information about the optimum prediction modes that were acquired by the acquiring unit, the deciding unit specifies incidence rates associated with those optimum prediction modes. Next, it is preferable for the deciding unit to either extract a combination of optimum prediction modes having incidence rates showing a larger value than a predetermined threshold value from among these specified incidence rates, or extract a combination of optimum prediction modes having incidence rates showing the largest value from among those specified incidence rates, or extract a combination of optimum prediction modes having a predetermined number of incidence rates that are selected in sequence from the incidence rate having the largest value from among those specified incidence rates. The deciding unit then decides the upper layer optimum prediction mode held by the extracted optimum prediction mode combination as the prediction mode search candidate to be searched in the encoding of the upper layer block.

Furthermore, in order to achieve efficient decision processing by the deciding unit, it is preferable for the scalable video encoding apparatus of the present invention to extract in advance a combination of effective optimum prediction modes by narrowing down the combinations of the optimum prediction modes described in the correspondence table based on the values of the incidence rates described in the correspondence table, and to create prediction mode correspondence information that describes the combinations of the extracted effective optimum prediction modes.

In this case, in scalable video encoding in which scalability is achieved by means of a layer structure, in order to achieve an increase in the speed of a prediction mode search, the scalable video encoding apparatus of the present invention includes: (1) a correspondence table creating unit that, based on information about an optimum prediction mode that was selected in scalable encoding performed without any limits being placed on the usage of prediction modes defined as being able to be used, determines incidence rates of combinations of optimum prediction modes to be selected for spatially corresponding blocks of an upper layer and a lower layer, and creates a correspondence table that describes relationships between combinations of the selected optimum prediction mode and the optimum prediction mode to be selected, and the incidence rates; (2) a prediction mode correspondence information creating unit that, based on the values of the incidence rates, extracts a combination of effective optimum prediction modes by narrowing down the combinations of the selected optimum prediction modes described in the correspondence table and the optimum prediction mode that should be selected, and creates prediction mode correspondence information that describes the combinations of the extracted effective optimum prediction modes; (3) an acquiring unit that, when encoding the upper layer block, acquires information about the optimum prediction mode selected in the encoding of the spatially corresponding lower layer block; (4) a deciding unit that, by referring to the prediction mode correspondence information using as a key the information about the selected optimum prediction mode acquired by the acquiring unit, the prediction mode search candidate that is to be searched in the encoding of the upper layer block is decided; and (5) a control unit that performs control such that scalable encoding in which limits are placed on the usage of prediction modes executed using the correspondence table, and scalable encoding in which no limits are placed on the usage of prediction modes executed without using the correspondence table are repeated alternatingly.

When this structure is employed, the prediction mode correspondence information creating unit is able to either: create prediction mode correspondence information by extracting as the effective combination the optimum prediction mode combination having an incidence rate showing a value which is larger than a predetermined threshold value; or, alternatively, create prediction mode correspondence information by extracting as the effective combination the optimum prediction mode combination having the incidence rate showing the largest value, from among the combinations of optimum prediction modes having the same optimum prediction mode in the lower layer; or create prediction mode correspondence information by extracting as the effective combination a combination of a predetermined number of optimum prediction modes selected in sequence from the incidence rate showing the largest value.

The scalable video encoding method of the present invention which is realized as a result of each of the above processing units operating is also able to be realized by a computer program. This computer program enables the present invention to be realized by being recorded on a suitable computer readable recording medium, or by being provided via a network, or by being installed on a computer and operated by a control unit such as a CPU when the present invention is to be implemented.

Effects of the Invention

In the present invention, in scalable video encoding which achieves scalability by means of a layer structure, because it is possible to narrow down the upper layer prediction mode search candidates using correlations of optimum prediction modes between layers, a reduction in the encoding time can be achieved.

Furthermore, in the present invention, when a reduction in the encoding time is achieved by narrowing down the prediction mode search candidates, because this narrowing down is performed based on corresponding relationships of optimum prediction modes between layers in already encoded frames, it is possible to avoid the risk of optimum prediction mode search candidates being omitted because of this narrowing down. Accordingly, it is possible to suppress any deterioration in the encoding performance which might possibly occur as a result of the prediction mode search candidates being narrowed down.

BRIEF DESCRIPTION OF THE DRAWINGS

FIG. 3 is a prediction mode correspondence rate table according to an embodiment of the present invention.

FIG. 4 is a table showing the results when the prediction mode search candidates are narrowed down in an embodiment of the present invention.

FIG. 5 is a table showing the results when the prediction mode search candidates are narrowed down in an embodiment of the present invention.

EMBODIMENTS FOR CARRYING OUT THE INVENTION

[1] The basic idea behind the embodiments of the present invention.

In an embodiment of the present invention, in scalable video encoding which achieves scalability by means of a layer structure, an increase in the speed at which prediction mode search is performed is achieved by means of two processes, namely:

(i) by creating a prediction mode correspondence rate table (i.e., a table describing correlations of optimum prediction modes between layers); and (ii) by narrowing down the prediction mode search candidates using this prediction mode correspondence rate table.

Figure 1:
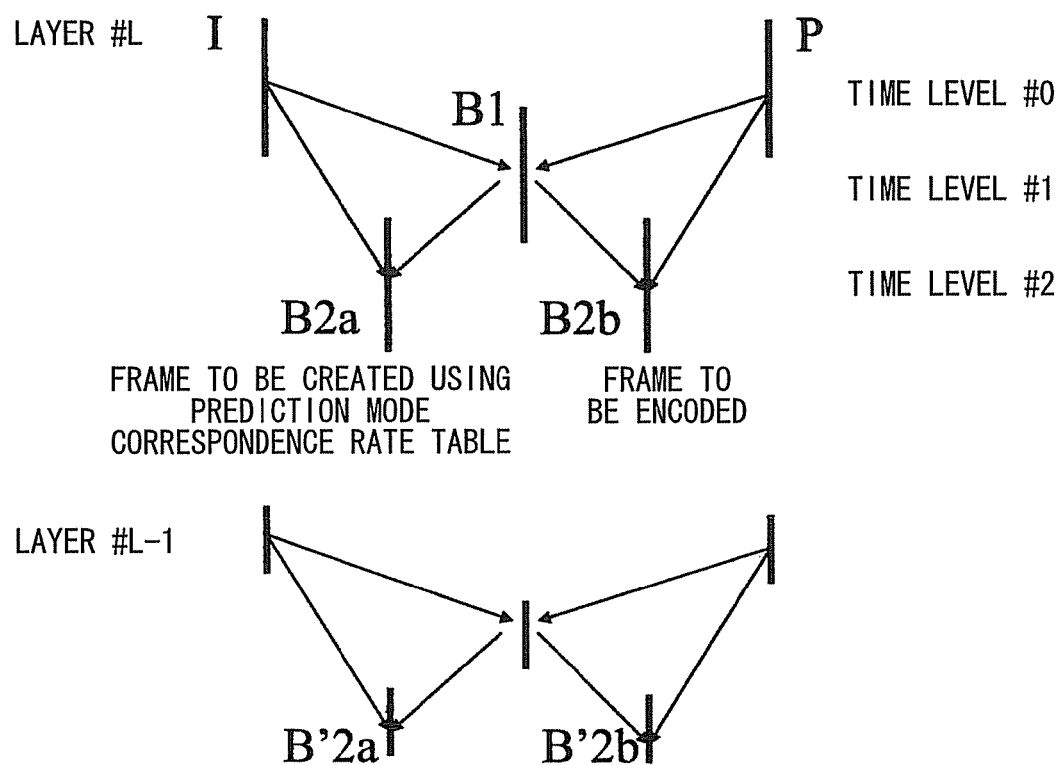
FIG. 1 is an explanatory view showing examples of frames targeted for encoding and frames targeted for creating a prediction mode correspondence rate table.

Hereinafter, the description proceeds in accordance with the example shown in FIG. 1. Namely, it is assumed that both a layer L and a layer L-1 are encoded using an IBBBP gradated B structure. Arrows in the diagram show a prediction reference destination. An encoding target layer is taken as L, an encoding target frame is taken as B2$b$, and a frame targeted for creating the prediction mode correspondence rate table is taken as B2$a$. Moreover, a frame of the layer L-1 at an identical timing to B2$b$ is taken as B'2$b$, and a frame of the layer L-1 at an identical timing to B2$a$ is taken as B'2$a$. The encoding is performed in sequence from the lowest time level and, within the same time level, encoding is performed in sequence from the frame having the earliest timing. The layers are encoded in this sequence from the smallest level.

Next, in reference to a flowchart shown in FIG. 2, the broad flow of the processing of the present embodiment will be described.

Figure 2:
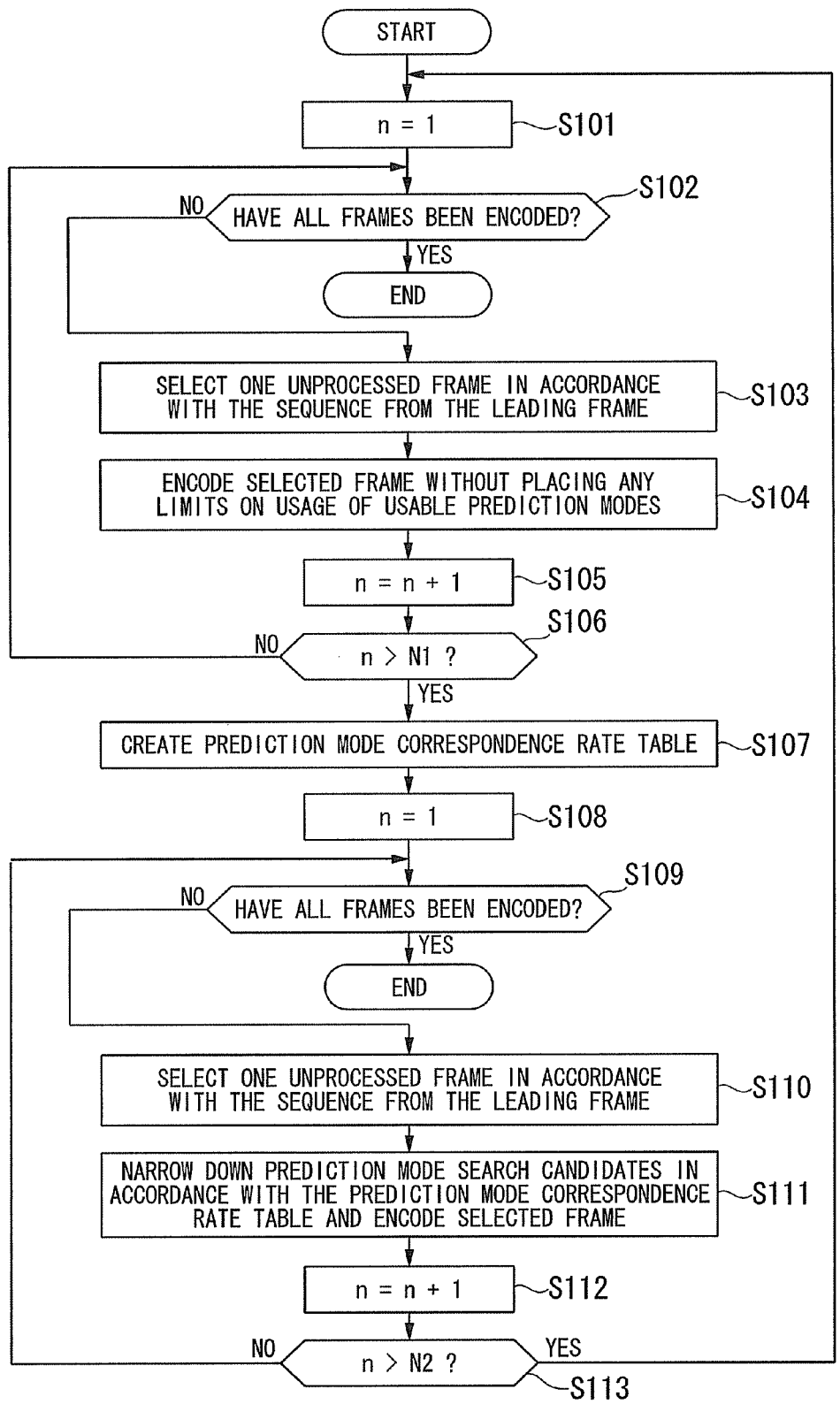
FIG. 2 is a flowchart showing the broad flow of video encoding processing according to an embodiment of the present invention.

In the present embodiment, when the scalable encoding is performed on videos, as is shown in the flowchart in FIG. 2, a variable n is set to 1 in step S101, and a determination is made as to whether or not all of the frames have been encoded in the subsequent step S102. If it is determined that all of the frames have been encoded, the routine is ended.

If, however, in accordance with the determination processing of step S102, it is determined that all of the frames have not been encoded, the routine moves to step S103 where one unprocessed frame is selected in accordance with the sequence from the leading frame. In the next step S104, the selected frame is encoded by making a prediction without placing any limits on the use of the prediction modes that have been defined as being able to be used, namely, by making a prediction using all of the usable prediction modes.

Next, in step S105, the value of the variable n is incremented by one. In the subsequent step S106, a determination is made as to whether or not the value of the variable n is greater than a predetermined threshold value N1 (wherein N1 is an integer of 1 or greater). If it is determined that the value of the variable n is not greater than the threshold value N1, the routine returns to the processing of step S102 and the encoding of frames continues without any limits being placed on the use of the prediction modes that have been defined as being capable of being used.

If, however, in the determination processing of step S106, it is determined that the value of the variable n is greater than the threshold value N1, the routine moves to step S107, and a prediction mode correspondence rate table is created. The prediction mode correspondence rate table has a data structure such as that described below, and is a table which describes correlations (i.e., incidence rates) of optimum prediction modes between layers.

Next, in step S108, the variable n is set to 1, and in the subsequent step S109, a determination is made as to whether or not all of the frames have been encoded. If it is determined that all of the frames have been encoded, the routine is ended.

If, however, in step S109, it is determined that all of the frames have not been encoded, the routine moves to step S110. In step S110, one unprocessed frame is selected in accordance with the sequence from the leading frame. In the next step S111, the selected frame is encoded by making a prediction while narrowing down the prediction mode search candidates using the prediction mode correspondence rate table.

Next, in step S112, the value of the variable n is incremented by one. In the subsequent step S113, a determination is made as to whether or not the value of the variable n is greater than a predetermined threshold value N2 (wherein N1 is an integer of 1 or greater). If it is determined that the value of the variable n is not greater than the threshold value N2, the routine returns to the processing of step S109 and the encoding of frames continues while the prediction mode search candidates are narrowed down using the prediction mode correspondence rate table.

If, however, in step S113, it is determined that the value of the variable n is greater than the threshold value N2, then it is determined to be necessary to update the prediction mode correspondence rate table and the routine returns to step S101. Accordingly, the processing of steps S101 through S113 continues while the prediction mode correspondence rate table is being updated.

In this manner, in the present embodiment, when scalable encoding is being performed on videos, after the N1$^{th}$ frame has been encoded, based on the results of this encoding, a prediction mode correspondence rate table which describes correlations (i.e., incidence rates) of optimum prediction modes between layers is created. Next, the routine moves to the encoding of the subsequent N2$^{th}$ frame, and the processing is repeated so as to encode the N2$^{th}$ frame while the prediction mode search candidates are narrowed down using the created prediction mode correspondence rate table.

(i) Creation of the Prediction Mode Correspondence Rate Table

Next, the prediction mode correspondence rate table creation processing executed in step S107, will be described.

As a result of the processing of step S104, the frame B2a created by the prediction mode correspondence rate table and the frame B'2a directly below it shown in FIG. 1 have already completed encoding, and the optimum prediction modes have already been selected. When the frames B2a and B'2a are being encoded, information about the selected optimum prediction mode is stored in a buffer. Based on this optimum prediction mode information which is stored in the buffer, a correspondence relationship is examined between the optimum prediction mode for the macro block (hereinafter, abbreviated to MB) of the frame B2a, and the sub macro block (hereinafter, abbreviated to SMB) of the spatially corresponding frame B'2a.

Specifically, a prediction mode correspondence rate table having a data structure such as that shown in FIG. 3 is created between B2a and B'2a. The numerical values shown in FIG. 3 show the ratio (i.e., incidence rate) at which, when the optimum prediction mode selected in each SMB (8×8 size) of the frame B'2a is i, the optimum prediction mode j is selected in the MB of the frame B2a. For example, if P16×16 is selected in the SMB of the frame B'2a, then in the MB of the frame B2a which spatially corresponds to the SMB in which P16×16 has been selected, it shows that a skip mode of 32.3% is selected.

Here, the method used to select the optimum prediction mode in the frames B2a and B'2a may be the JSVM method described in Non-patent document 2, or a method in which the prediction mode search candidates are narrowed down such as that described in Patent document 1.

Moreover, in this example, the target frame of the prediction mode correspondence rate table is taken as a single frame (i.e., B2a) which has already been encoded and has the same time level as the target frame to be encoded, however, it is not limited to this. It is also possible to target a frame which has already been encoded and has a different time level (for example, B1). Moreover, it is also possible to target a plurality of frames (for example, B1 and B2a) and to calculate the correspondence rate using the sum of this plurality of frames. Namely, provided that the frames have already completed encoding in the encoding target layer and in the layer immediately below that, then they may be target frames to be created by the prediction mode correspondence rate table.

(ii) Narrowing Down of the Prediction Mode Search Candidates using a Prediction Mode Correspondence Rate Table Next, a description will be given of the processing to narrow down the prediction mode search candidates using the prediction mode correspondence rate table described in step S111.

The prediction mode search candidates are narrowed down in each MB of the encoding target frame B2b in accordance with the values of the prediction mode correspondence rates in the prediction mode correspondence rate table created in step S107. The numerical values in the prediction mode correspondence rate table show the probability of an optimum prediction mode being in a particular encoding target macro block.

The processing to narrow down the prediction mode search candidates will now be described in more detail. In the description given below, the encoding target macro block of the frame B2b is written as MBL, while the sub macro block of the frame B'2b of the layer L-1 which is spatially in the same position as this MBL it is written as SMBL-1.

When narrowing down the prediction mode search candidates of the macro block MBL, firstly, information about the optimum prediction mode of the sub macro block SMBL-1 is read. Next, the prediction mode correspondence rate table is collated with the SMBL-1 optimum prediction mode, and the probability (i.e., the incidence rate) of each prediction mode in the encoding target macro block MBL being the optimum prediction mode is investigated. Next, based on this probability of being the optimum prediction mode, the prediction mode search candidates are narrowed down. Two examples of this narrowing down are given below.

(a) Narrowing Down Procedure 1

Narrowing down procedure 1 is a procedure for narrowing down prediction mode search candidates using threshold values for narrowing down prediction mode search candidates.

In this narrowing down procedure 1, a threshold value t % for narrowing down prediction mode search candidates is provided, and prediction modes that are less than this threshold value t % are removed from the search candidates. The value of the threshold value t is provided externally. An example of the method used to decide this value is one in which a value that limits any deterioration in the encoding performance to within an allowable range is decided by performing encoding processing a plurality of times.

Here, if a method is used in which the probability (i.e., correspondence rate) of each prediction mode in the MBL being the optimum prediction mode is read from the prediction mode correspondence rate table at the point in time when the information about the optimum prediction mode for SMBL-1 was acquired, and is compared with the threshold value for narrowing down the prediction mode search candidates, then the required comparison processing becomes extremely complex.

Therefore, threshold value processing is performed in advance on the correspondence rates of the prediction mode correspondence rate table using the prediction mode search candidate narrowing down threshold values so that the correspondence rates of the prediction mode correspondence table are binarized.

The results of the narrowing down of prediction mode search candidates when the threshold value for the narrowing down of the prediction mode search candidates was set at 5% in the prediction mode correspondence rate table shown in FIG. 3 are shown in FIG. 4. In FIG. 4, "○" represents search candidates, and "×" represents prediction modes removed from the search candidates.

(b) Narrowing Down Procedure 2

Narrowing down procedure 2 is a procedure in which only prediction modes in which the prediction mode correspondence rate is at the maximum are set as search candidates.

Prediction modes in which the prediction mode correspondence rate is at the maximum are set as search candidates. In this case, the search candidates will normally be narrowed down to a single prediction mode, however, when there are a plurality of prediction mode search candidates that provide a maximum value, these are all set as search candidates.

Here, if a method is used in which the probability (i.e., correspondence rate) of each prediction mode in the MBL being the optimum prediction mode is read from the prediction mode correspondence rate table at the point in time when the information about the optimum prediction mode for SMBL-1 was acquired, and the correspondence rate having the maximum value from among these is specified, then the required specifying processing becomes extremely complex.

Therefore, the correspondence rate having the maximum value which is contained in the correspondence rates of the prediction mode correspondence table is specified, and the correspondence rate of the prediction mode correspondence table is binarized.

The results of the narrowing down when the prediction mode having the maximum value in the prediction mode correspondence rate table shown in FIG. 3 was set as the prediction mode search candidate are shown in FIG. 5. In FIG. 5, "○" represents search candidates, and "×" represents prediction modes removed from the search candidates.

Hereinafter, the present invention will be described in more detail in accordance with the embodiments.

Figure 6:
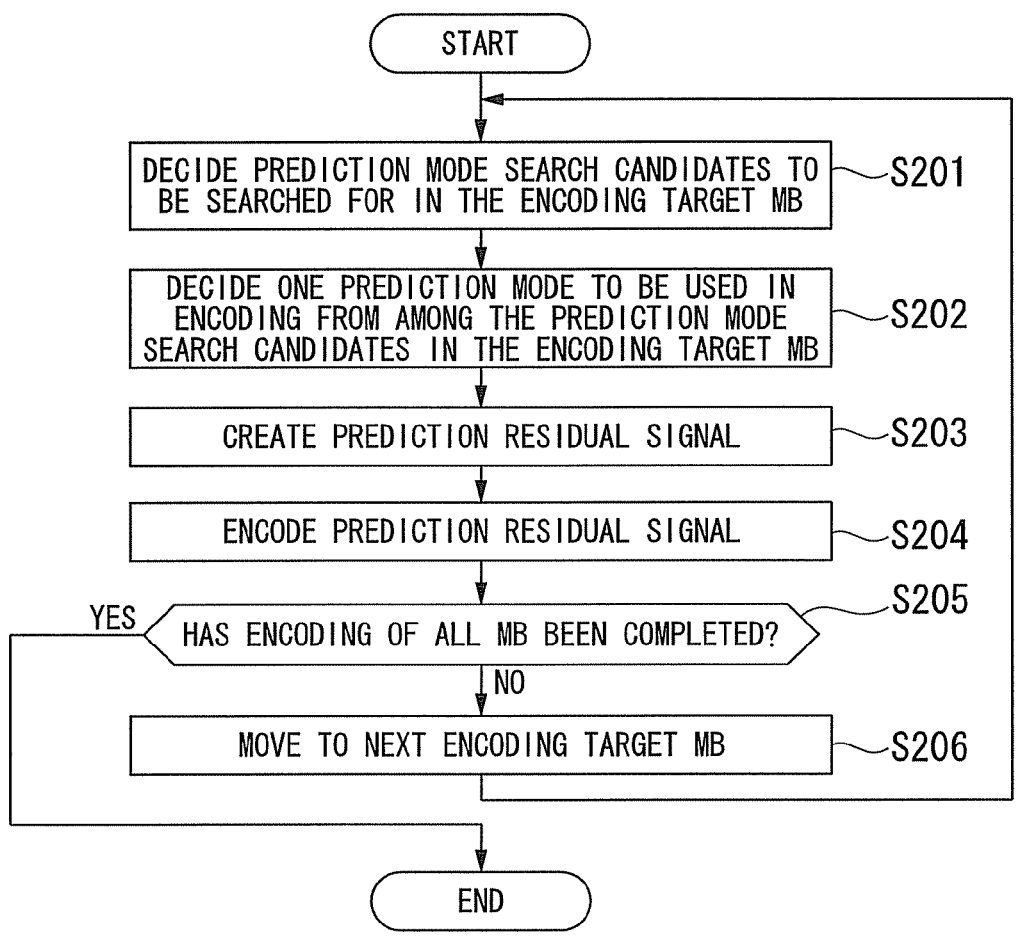
FIG. 6 is a flowchart showing scalable video encoding processing according to an embodiment of the present invention.
Figure 7:
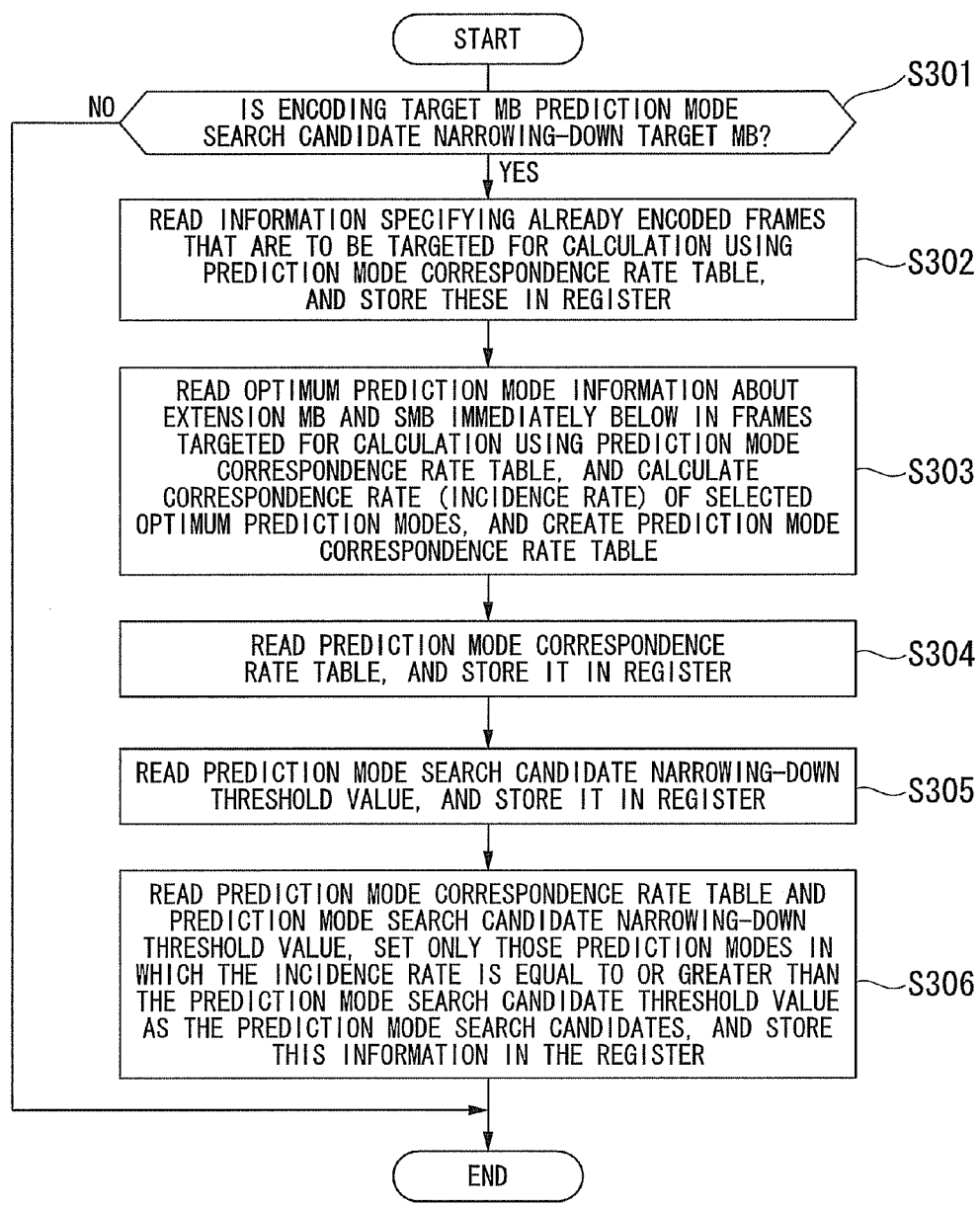
FIG. 7 is a flowchart showing an example of processing to decide prediction mode search candidates which is executed in the scalable video encoding processing shown in FIG. 6.
Figure 8:
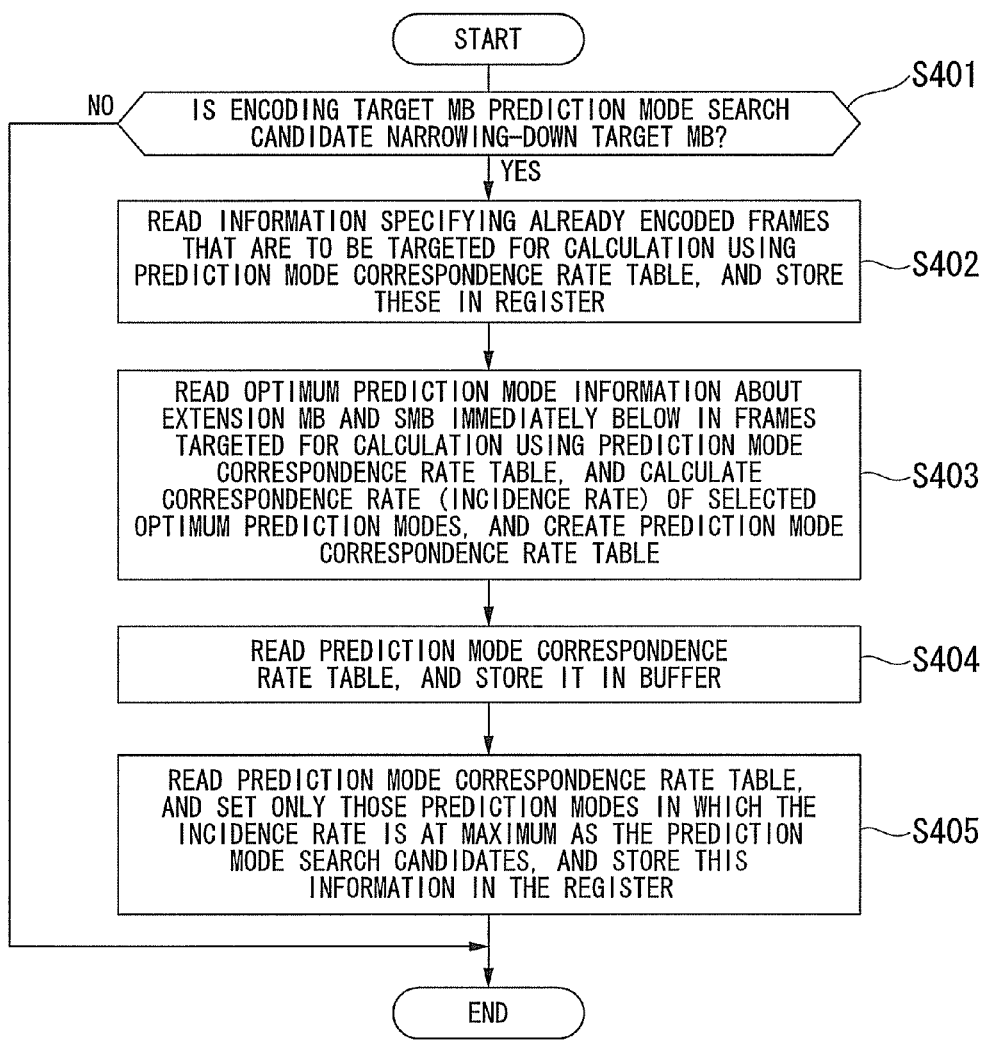
FIG. 8 is a flowchart showing another example of processing to decide prediction mode search candidates which is executed in the scalable video encoding processing shown in FIG. 6.

FIG. 6 through FIG. 8 are flowcharts showing the scalable video encoding processing executed by the present embodiment.

FIG. 6 is a flowchart showing the overall scalable video encoding processing executed by the present embodiment. FIG. 7 and FIG. 8 are flowcharts showing an example and another example of details of the processing executed in step S201 of the flowchart shown in FIG. 6.

Next, the scalable video encoding processing executed by the present embodiment will be described in detail in accordance with these flowcharts.

The encoding processing of the present embodiment is processing for enhancement layers, and non-scalable single layer encoding processing is applied to the base layer. An example of single layer encoding processing is the encoding processing of the base layer portion of the SVC reference encoder JVSM mentioned in Non-patent document 2.

The processing of steps S201 through S206 executed in the flowchart shown in FIG. 6 will now be described.

In step S201, initial values of the prediction mode search candidates to be searched in the encoding target macro block (MB) are read, and the search candidates for the prediction mode which are to be searched ultimately in the encoding target MB are decided and stored in a register. This processing is described in detail below with reference to FIG. 7 and FIG. 8.

In step S202, information about the prediction mode search candidates that was stored as a result of the processing of step S201 is read from the register, and a search of each prediction mode search candidate is executed. One optimum prediction mode to be used for the encoding is then decided and information about this mode is stored in the register. One example of a method of deciding the optimum prediction mode is a method which is performed in JSVM in which a prediction mode in which the encoding costs which are expressed by a linear sum of the coding bit and encoding distortion are minimized is regarded as the optimum prediction mode.

In step S203, information about the optimum prediction mode in the encoding target MB is read from the register, and motion compensation is performed in this optimum prediction mode. A prediction residual signal is then created and is stored in a buffer.

In step S204, the prediction residual signal is read from the buffer and this prediction residual signal is then encoded and the resulting encoded data is stored in the buffer. One example of this processing is the DCT, quantification, and variable length encoding processing sequence in the SVC reference encoder JSVM mentioned in Non-patent document 2.

In step S205, determination processing is performed to determine whether or not encoding of all the MB has been completed. If encoding of all of the MB has been completed, the encoding processing is ended and the encoded data of each MB as well as other necessary header information is read from the buffer, and is output as final encoded data. If encoding of all of the MB has not been completed, the routine moves to step S206.

In step S206, the processing moves to the next encoding target MB, and the processing of step S201 is performed.

Next, an example of the specific processing executed in step S201 will be described using the flowchart shown in FIG. 7 which includes step S301 through step S306.

In step S301, information is read that specifies whether or not the MB targeted for encoding is an MB targeted for the prediction mode search candidate narrowing down which is the object of the present embodiment. If the MB targeted for encoding is an MB targeted for the prediction mode search candidate narrowing down, the routine moves to the processing of step S302. If the MB targeted for encoding is not an MB targeted for the prediction mode search candidate narrowing down, the initial value of the prediction mode search candidate is output as the final prediction mode search candidate.

In step S302, information specifying the already encoded frames that are targeted for calculation of the prediction mode correspondence rate table is read from the outside, and the prediction mode information about the specified frames is stored in the register.

In step S303, the prediction mode information (i.e., information about the optimum prediction mode used in the encoding) in the frames that are targeted for calculation of the prediction mode correspondence rate table is read, and the correspondence rates (i.e., the incidence rates) of the optimum prediction modes of the layer targeted for encoding and of the layer directly beneath that are calculated and stored in the register as a prediction mode correspondence rate table. A prediction mode correspondence rate table such as that shown in FIG. 3 is created and stored in the register.

In step S304, the prediction mode correspondence rate table is read and this table is then stored in the buffer.

In step S305, the prediction mode search candidate narrowing down threshold value is read and is then stored in the register.

In step S306, the prediction mode correspondence rate table is read from the buffer, and the prediction mode search candidate narrowing down threshold values are also read from the register. Only those prediction modes in which the correspondence rate (i.e., the incidence rate) is equal to or greater than the prediction mode search candidate narrowing down threshold value are set as prediction mode search candidates, and information about these is stored in the register. When these settings and storages are being made, only the prediction mode search candidates that are associated with the optimum prediction mode obtained by encoding the base layer are selected, set, and stored.

In this manner, in the flowchart shown in FIG. 6, based on a prediction mode correspondence rate table having a data structure such as that shown in FIG. 3, processing is performed so as to narrow down the prediction mode search candidates in a format such as that shown in FIG. 4.

Next, another example of the specific processing executed in step S201 will be described using the flowchart shown in FIG. 8 which includes step S401 through step S405.

In step S401, information is read that specifies whether or not the MB targeted for encoding is an MB targeted for the prediction mode search candidate narrowing down which is the object of the present embodiment. If the MB targeted for encoding is an MB targeted for the prediction mode search candidate narrowing down, the routine moves to the processing of step S402. If the MB targeted for encoding is not an MB targeted for the prediction mode search candidate narrowing down, the initial value of the prediction mode search candidate is output as the final prediction mode search candidate.

In step S402, information specifying the already encoded frames that are targeted for calculation of the prediction mode correspondence rate table is read from the outside, and the prediction mode information about the specified frames is stored in the register.

In step S403, the prediction mode information (i.e., information about the optimum prediction mode used in the encoding) in the frames that are targeted for calculation of the prediction mode correspondence rate table is read. Next, the correspondence rates (i.e., the incidence rates) of the optimum prediction modes of the layer targeted for encoding and of the layer directly beneath that are calculated and stored in the register as a prediction mode correspondence rate table. Namely, a prediction mode correspondence rate table such as that shown in FIG. 3 is created and stored in the register.

In step S404, the prediction mode correspondence rate table is read and this table is then stored in the buffer.

In step S405, the prediction mode correspondence rate table is read from the buffer, and only the prediction mode having the maximum correspondence rate (i.e., the incidence rate) is set as the prediction mode search candidate, and information about this is stored in the register. Here, when these settings and storages are being made, only the prediction mode search candidates that are associated with the optimum prediction mode obtained by encoding the base layer are selected, set, and stored.

In this manner, in the flowchart shown in FIG. 6, based on a prediction mode correspondence rate table having a data structure such as that shown in FIG. 3, processing is performed so as to narrow down the prediction mode search candidates in a format such as that shown in FIG. 5.

Figure 9:
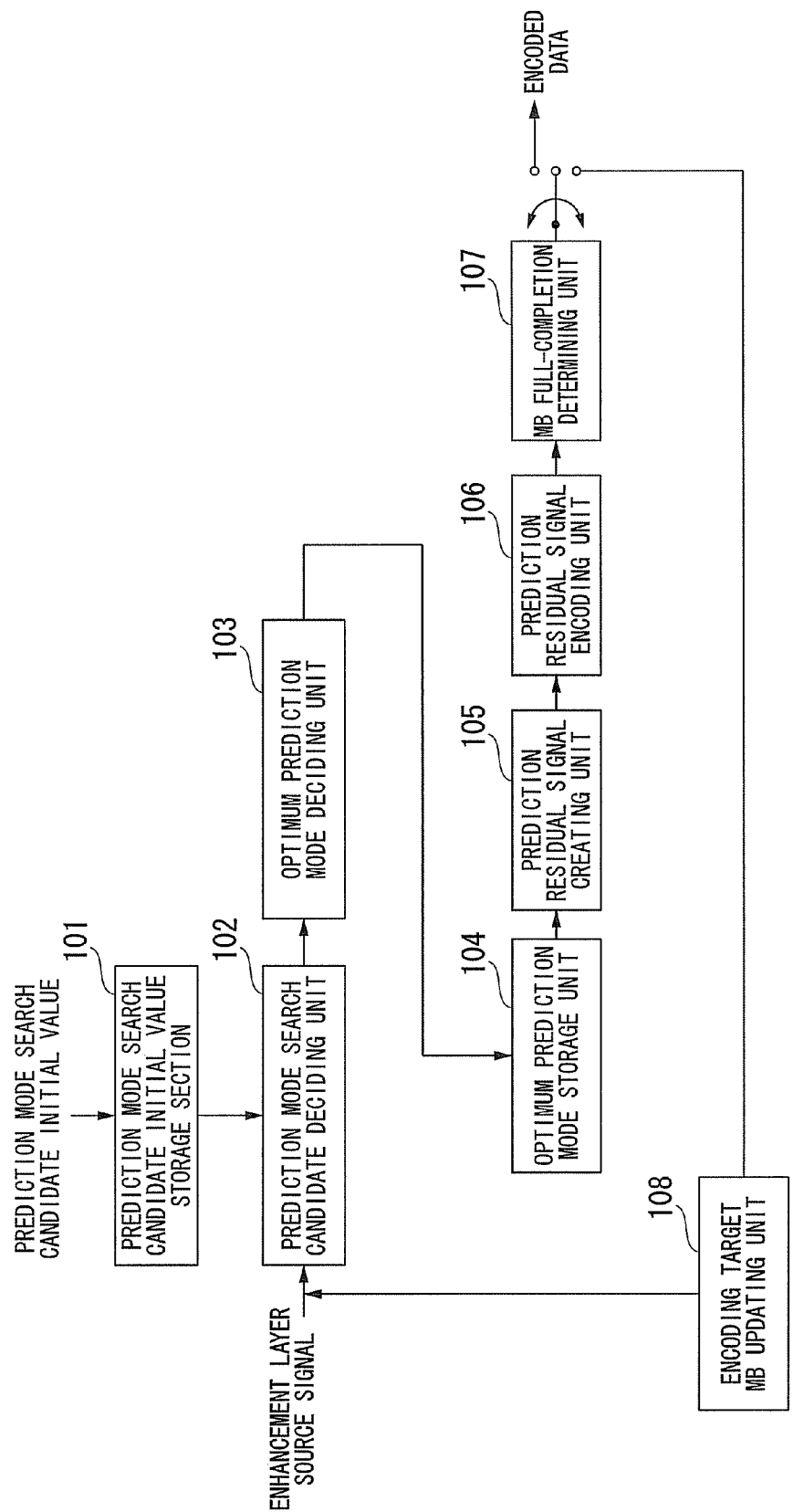
FIG. 9 is a block diagram showing a scalable video encoding apparatus according to an embodiment of the present invention.
Figure 10:
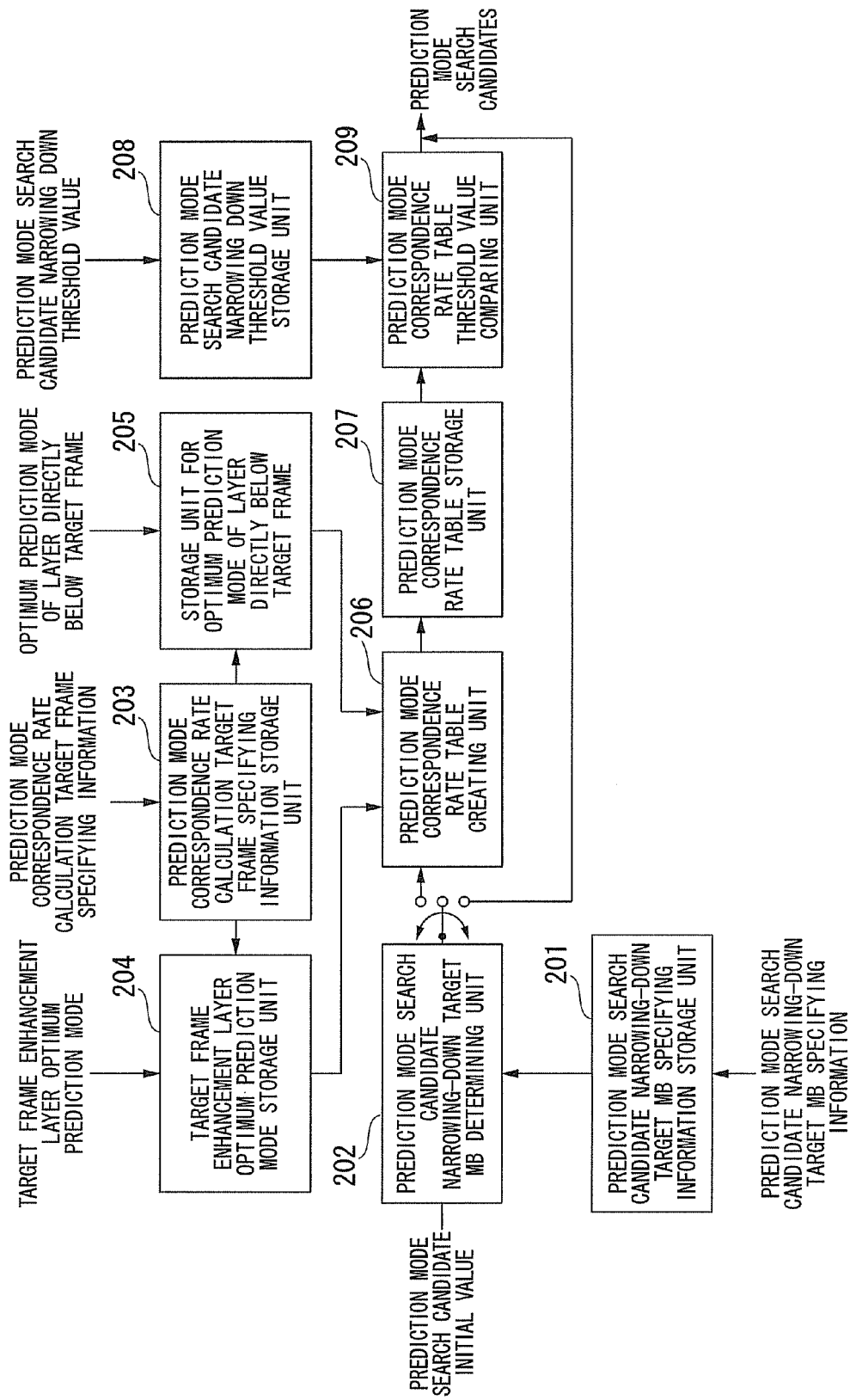
FIG. 10 is a block diagram showing an example of a prediction mode search candidate decision unit in the scalable video encoding apparatus shown in FIG. 9.
Figure 11:
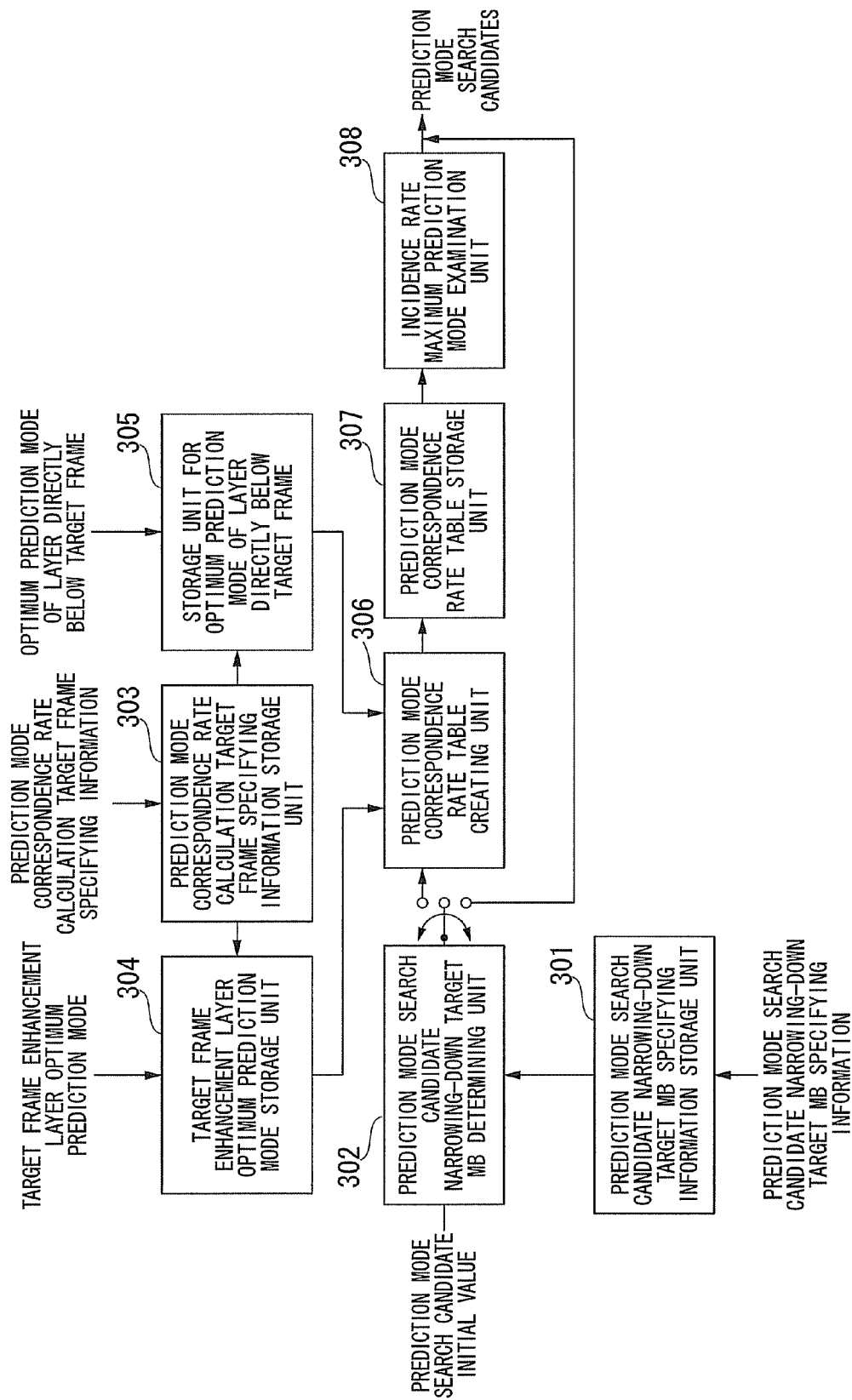
FIG. 11 is a block diagram showing another example of a prediction mode search candidate decision unit in the scalable video encoding apparatus shown in FIG. 9.

FIG. 9 through FIG. 11 show the structure of a scalable video encoding apparatus according to an embodiment of the present invention.

FIG. 9 shows the overall structure of the scalable video encoding apparatus of the present embodiment. FIG. 10 and FIG. 11 show an example and another example of the detailed structure of a prediction mode search candidate deciding unit 102 shown in FIG. 9.

Next, the scalable video encoding apparatus of the present embodiment will be described in detail with reference to these apparatus structural diagrams.

The scalable video encoding apparatus of the present embodiment is a processing apparatus for enhancement layers, and non-scalable single layer encoding processing is applied to the base layer. An example of single layer encoding processing is the encoding processing of the base layer portion of the SVC reference encoder JVSM mentioned in Nonpatent document 2.

Firstly, the overall structure of the scalable video encoding apparatus will be described with reference to FIG. 9.

A prediction mode search candidate initial value storage unit 101 reads initial values of the prediction mode search candidates, and outputs these to a register.

The prediction mode search candidate deciding unit 102 reads initial values for the prediction mode search candidates, and decides the prediction mode search candidates to be ultimately searched. Next, the prediction mode search candidate deciding unit 102 outputs to the register the information about the prediction mode search candidates that was ultimately decided, and the processing moves to the optimum prediction mode deciding unit 103. The detailed structure of this processing unit will be described below using FIG. 10 and FIG. 11.

The optimum prediction mode deciding unit 103 reads the prediction mode search candidates from the register, and executes a search of each prediction mode search candidate. Next, the optimum prediction mode deciding unit 103 decides one optimum prediction mode to be used for the encoding, and outputs information about this mode to an optimum prediction mode storage unit 104. One example of a method of deciding the optimum prediction mode is a method which is performed in JSVM in which a prediction mode in which the encoding costs which are expressed by a linear sum of the coding bit and encoding distortion are minimized is regarded as the optimum prediction mode.

The prediction residual signal creating unit 105 reads the optimum prediction mode in the encoding target MB from the optimum prediction mode storage unit 104, and performs motion compensation in this optimum prediction mode. It then creates a prediction residual signal and outputs this to a buffer.

The prediction residual signal encoding unit 106 then reads the prediction residual signal in the MB targeted for encoding from the buffer and performs encoding on this prediction residual signal. The encoded data is then output to the buffer. One example of this processing is the DCT, quantification, and variable length encoding processing sequence of the SVC reference encoder JSVM mentioned in Non-patent document 2.

The MB full-completion determination unit 107 performs determination processing to determine whether or not encoding of all the MB has been completed. If encoding of all of the MB has been completed, the encoding processing is ended and the final encoded data is output. If encoding of all of the MB has not been completed, the routine moves the processing of an encoding target MB updating unit 108.

The encoding target MB updating unit 108 moves the processing to the next MB targeted for encoding, and the processing of the prediction mode search candidate deciding unit 102 is performed.

Next, an example of the detailed structure of the prediction mode search candidate deciding unit 102 will be described with reference to FIG. 10.

A prediction mode search candidate narrowing down target MB specifying information storage unit 201 reads information specifying whether or not an MB is to undergo prediction mode search candidate narrowing down, and outputs this information to a register.

A prediction mode search candidate narrowing down target MB determining unit 202 reads information specifying MB that are to undergo prediction mode search candidate narrowing down from the prediction mode search candidate narrowing down target MB specifying information storage unit 201, and performs determination processing to determine whether or not an MB targeted for encoding is an MB to be narrowed down. If the MB targeted for encoding is an MB to be narrowed down, the routine moves to the processing of a prediction mode correspondence rate table creating unit 206. If the MB targeted for encoding is not an MB to be narrowed down, then the initial value of the prediction mode search candidate is decided as the final prediction mode search candidate, and is output.

A prediction mode correspondence rate calculation target frame specifying information storage unit 203 reads information specifying frames that have already been encoded and are targeted for prediction mode correspondence rate calculation, and outputs it to the register.

A target frame enhancement layer optimum prediction mode storage unit 204 reads the optimum prediction mode information of a layer targeted for encoding for frames that are targeted for prediction mode correspondence rate calculation which are specified by specification information read from the prediction mode correspondence rate calculation target frame specifying information storage unit 203, and outputs it to the register.

A storage unit 205 for optimum prediction modes for the layer directly beneath a target frame reads the optimum prediction mode information of a layer directly beneath the layer targeted for encoding for frames that are targeted for prediction mode correspondence rate calculation which are specified by specification information read from the prediction mode correspondence rate calculation target frame specifying information storage unit 203, and outputs it to the register.

The prediction mode correspondence rate table creating unit 206 reads from the target frame enhancement layer optimum prediction mode storage unit 204 optimum prediction mode information in a layer targeted for encoding of a frame targeted for prediction mode correspondence rate calculation. Furthermore, the prediction mode correspondence rate table creating unit 206 also reads the optimum prediction mode information of a layer directly beneath the layer targeted for encoding of frames that are targeted for prediction mode correspondence rate calculation from the storage unit 205 for optimum prediction modes for the layer directly beneath a target frame, and calculates the correspondence rates (i.e., the incidence rates) of optimum prediction modes between corresponding macro-blocks and sub macro-blocks, and outputs the results to a prediction mode correspondence rate table storage unit 207 as a prediction mode correspondence rate table.

A prediction mode search candidate narrowing down threshold value storage unit 208 reads threshold values for narrowing down prediction mode search candidates, and outputs them to the register.

A prediction mode correspondence rate table threshold value comparison unit 209 reads prediction mode correspondence rate tables from the prediction mode correspondence rate table storage unit 207, and also reads threshold values for narrowing down prediction mode search candidates from the prediction mode search candidate narrowing down threshold value storage unit 208. Next, the prediction mode correspondence rate table threshold value comparison unit 209 examines the incidence probability of an optimum prediction mode of an MB targeted for encoding which is associated with the optimum prediction mode of the SMB immediately below it, and then sets only prediction modes whose incidence probability is equal to or greater than the prediction mode search candidate narrowing down threshold value as prediction mode search candidates, and outputs these.

In this manner, in the apparatus structure shown in FIG. 10, based on a prediction mode correspondence rate table having a data structure such as that shown in FIG. 3, processing is performed so as to narrow down the prediction mode search candidates in a format such as that shown in FIG. 4.

Next, another example of the detailed structure of the prediction mode search candidate deciding unit 102 will be described with reference to FIG. 11.

A prediction mode search candidate narrowing down target MB specifying information storage unit 301 reads information specifying whether or not an MB is to undergo prediction mode search candidate narrowing down, and outputs this information to a register.

A prediction mode search candidate narrowing down target MB determining unit 302 reads information specifying MB that are to undergo prediction mode search candidate narrowing down from the prediction mode search candidate narrowing down target MB specifying information storage unit 301, and performs determination processing to determine whether or not an MB targeted for encoding is an MB to be narrowed down. If the MB targeted for encoding is an MB to be narrowed down, the routine moves to the processing of a prediction mode correspondence rate table creating unit 306. If the MB targeted for encoding is not an MB to be narrowed down, then the initial value of the prediction mode search candidate is decided as the final prediction mode search candidate, and is output.

A prediction mode correspondence rate calculation target frame specifying information storage unit 303 reads information specifying frames that have already been encoded and are targeted for prediction mode correspondence rate calculation, and outputs it to the register.

A target frame enhancement layer optimum prediction mode storage unit 304 reads the optimum prediction mode information of a layer targeted for encoding for frames that are targeted for prediction mode correspondence rate calculation which are specified by specification information read from the prediction mode correspondence rate calculation target frame specifying information storage unit 303, and outputs it to the register.

A storage unit 305 for optimum prediction modes for the layer directly beneath a target frame reads the optimum prediction mode information of a layer directly beneath the layer targeted for encoding for frames that are targeted for prediction mode correspondence rate calculation which are specified by specification information read from the prediction mode correspondence rate calculation target frame specifying infatuation storage unit 303, and outputs it to the register.

The prediction mode correspondence rate table creating unit 306 reads from the target frame enhancement layer optimum prediction mode storage unit 304 optimum prediction mode information in a layer targeted for encoding of a frame targeted for prediction mode correspondence rate calculation. Furthermore, the prediction mode correspondence rate table creating unit 306 also reads the optimum prediction mode information of a layer directly beneath the layer targeted for encoding of frames that are targeted for prediction mode correspondence rate calculation from the storage unit 305 for optimum prediction modes for the layer directly beneath a target frame. Next, the prediction mode correspondence rate table creating unit 306 calculates the correspondence rates (i.e., the incidence rates) of optimum prediction modes between corresponding macro-blocks and sub macro-blocks, and outputs the results to a prediction mode correspondence rate table storage unit 307 as a prediction mode correspondence rate table.

An incidence rate maximum prediction mode examination unit 308 reads prediction mode correspondence rate tables from the prediction mode correspondence rate table storage unit 207, and examines the incidence probability of an optimum prediction mode of an MB targeted for encoding for the optimum prediction mode of the SMB immediately below it, and then sets the prediction mode whose incidence probability at the maximum as the final prediction mode search candidate, and outputs this.

In this manner, in the apparatus structure shown in FIG. 11, based on a prediction mode correspondence rate table having a data structure such as that shown in FIG. 3, processing is performed so as to narrow down the prediction mode search candidates in a format such as that shown in FIG. 5.

Next, results of an experiment that was performed in order to verify the effectiveness of the present invention will be described.

Figure 12:
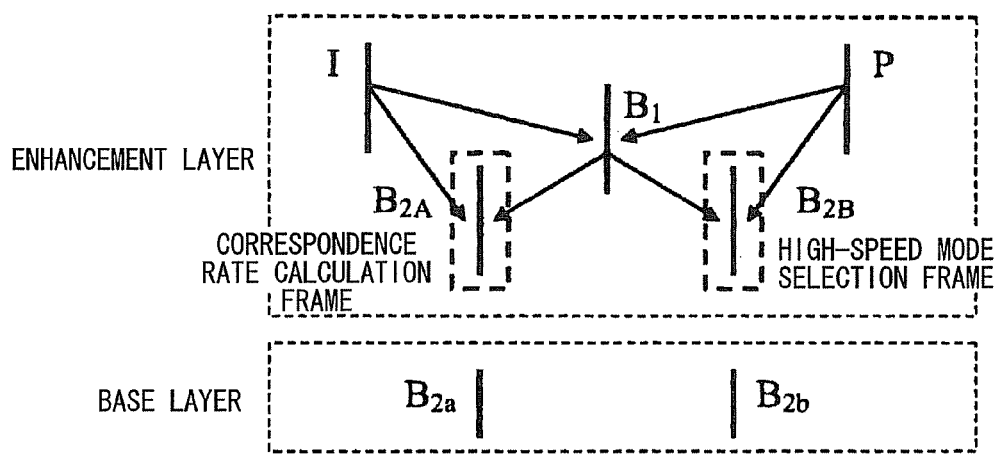
FIG. 12 is an explanatory view showing a correspondence calculation frame and a high speed mode selection frame in an experiment which was performed in order to verify the effectiveness of an embodiment of the present invention.

This experiment was performed by installing the present embodiment in JSVM 9.12.2, and then comparing JSVM with the present embodiment. The images used were SVC test images "City" and "Soccer" having a size of 704×576, and "Pedestrian" and "Station" having a size of 1920×1024. Images having the above resolutions were input into the enhancement layer, while images having pixel number resolutions both vertically and horizontally of half of those given above were input into the base layer. The number of encoded image frames was 129, and four QP (Quantization Parameters), namely, 22, 27, 32, and 37 were tested with the same values being used in both layers. The GOP (Group Of Pictures) structure was the IBBBP hierarchical B picture structure and I was input every 16 frames. As is shown in FIG. 12, two frames belonging to the lowest time level were used respectively for the level correspondence rate calculation frame and high speed mode selection frame. A Xeon 3.16 GHz CPU was used for the encoding time measurement.

Results of the coding bit increase rate and the encoding time decrease rate experiments are shown in Table 1.

TABLE 1

|  | Encoding time decrease rate | Coding bit increase rate |
| --- | --- | --- |
| City | 22.97% | 0.62% |
| Soccer | 21.63% | 0.80% |
| Pedestrian | 18.80% | 0.77% |
| Station | 21.46% | 0.11% |

Here, the coding bit increase rate was created by performing Piecewise Cubic Hermite Polynominal Interpolation on an approximate curve between four plotted points of the coding bit and PSNR (Peak Signal to Noise Ratio) in each QP, and the mean differential value of code quantities in common segments of the two data sets being compared was set as the relevant increase rate. Moreover, the encoding time decrease rate is the mean value in each QP.

Figure 13:
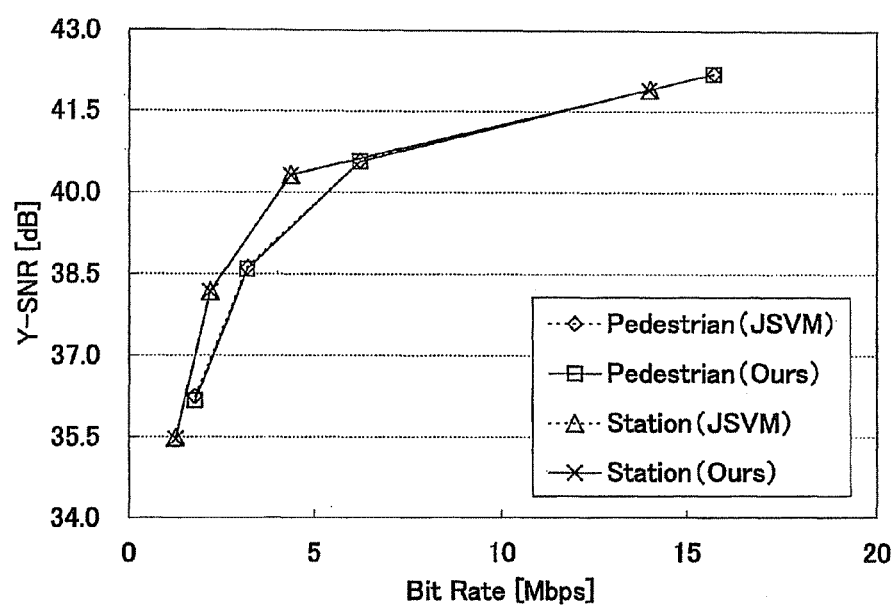
FIG. 13 is a graph showing experimental results of an experiment which was performed in order to verify the effectiveness of an embodiment of the present invention.
Figure 14:
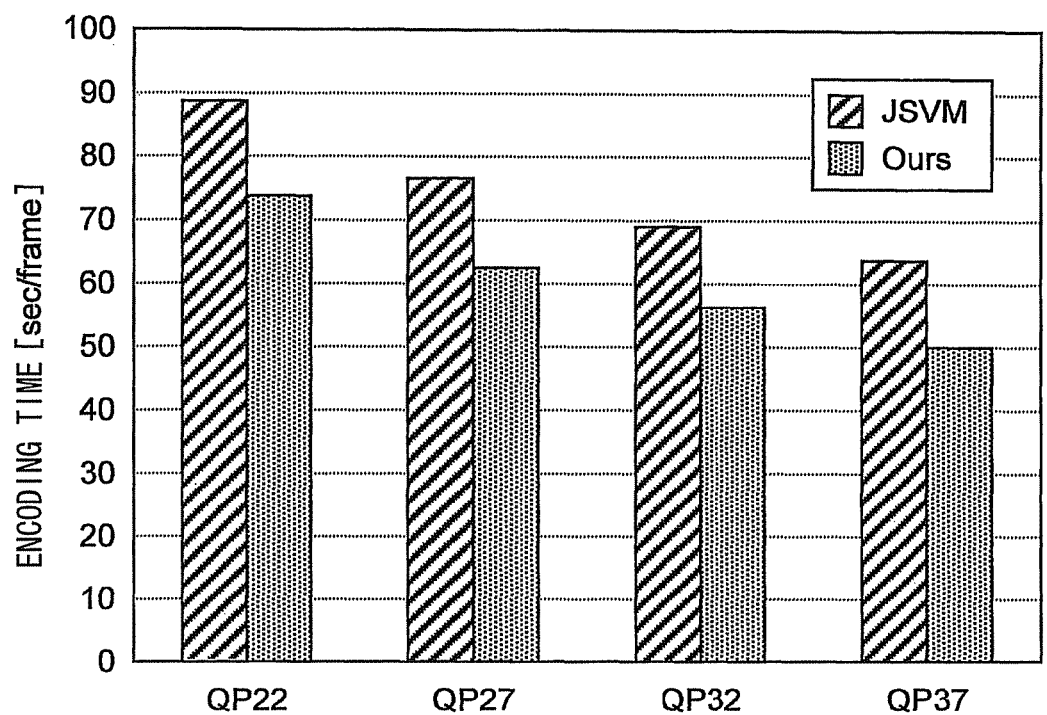
FIG. 14 is a graph showing experimental results of an experiment which was performed in order to verify the effectiveness of an embodiment of the present invention.

Encoding characteristics of the encoding of the "Pedestrian" and "Station" images are shown in FIG. 13, and changes in the encoding time in the encoding of "Pedestrian" are shown in FIG. 14.

From the experiment results given above, it was confirmed that, irrespective of the resolution or images, it was possible to achieve an encoding time decrease rate of approximately 20%, while the coding bit increase rate was held to less than 1%.

The present invention is not limited to the above described embodiment. For example, in the above described embodiment, an example is described in which the present invention is applied to a gradated layer structure formed by a base layer and an enhancement layer, however, applications of the present invention are not limited to this type of gradated layer structure.

INDUSTRIAL APPLICABILITY

The present invention can be applied to scalable moving picture encoding that achieves scalability by using a layer structure, and it is possible to decrease encoding time by applying the present invention.

| Reference Numerals | |
| --- | --- |
| 101 | Prediction mode search candidate initial value storage unit |
| 102 | Prediction mode search candidate deciding unit |
| 103 | Optimum prediction mode deciding unit |
| 104 | Optimum prediction mode deciding unit |
| 105 | Prediction residual signal creating unit |
| 106 | Prediction residual signal encoding unit |
| 107 | MB full-completion determination unit |
| 108 | Encoding target MB update unit |
| 201 | Prediction mode search candidate narrowing-down target MB specifying information storage unit. |
| 202 | Prediction mode search candidate narrowing-down target MB determination unit |
| 203 | Prediction mode correspondence rate calculation target frame specifying information storage unit |
| 204 | Target frame enhancement layer optimum prediction mode storage unit |
| 205 | Storage unit for optimum prediction mode for the layer directly beneath a target frame |
| 206 | Prediction mode correspondence rate table creating unit |
| 207 | Prediction mode correspondence rate table storage unit |
| 208 | Prediction mode search candidate narrowing-down threshold value storage unit |

Reference Numerals

| | |
|---|---|
| 209 | Prediction mode correspondence rate table threshold value comparison unit |
| 301 | Prediction mode search candidate narrowing-down target MB specifying information storage unit |
| 302 | Prediction mode search candidate narrowing-down target MB determination unit |
| 303 | Prediction mode correspondence rate calculation target frame specifying information storage unit |
| 304 | Target frame enhancement layer optimum prediction mode storage unit |
| 305 | Storage unit for optimum prediction mode for the layer directly beneath a target frame |
| 306 | Prediction mode correspondence rate table creating unit |
| 307 | Prediction mode correspondence rate table storage unit |
| 308 | Incidence rate maximum prediction mode examination unit |

The invention claimed is:

1. A scalable video encoding method for scalably encoding videos, comprising:
  a step in which, based on information about an optimum prediction mode that was selected in scalable encoding performed without any limits being placed on the usage of prediction modes defined as being able to be used, incidence rates of combinations of optimum prediction modes to be selected for spatially corresponding blocks of an upper layer and a lower layer are determined, and a correspondence table is created that describes relationships between combinations of the selected optimum prediction mode and the optimum prediction mode to be selected and the incidence rates;
  a step in which, based on the values of the incidence rates, a combination of effective optimum prediction modes is extracted by narrowing down the combinations of the selected optimum prediction modes described in the correspondence table and the optimum prediction mode to be selected, and prediction mode correspondence information that describes the combinations of the extracted effective optimum prediction modes is created;
  a step in which, when encoding the upper layer block, information about the optimum prediction mode selected in the encoding of the spatially corresponding lower layer block is acquired; and
  a step in which, by referring to the prediction mode correspondence information using as a key the information about the selected optimum prediction mode acquired in the acquiring step, the prediction mode search candidate to be searched in the encoding of the upper layer block is decided.

2. The scalable video encoding method according to claim 1, wherein,
  in the step to create the prediction mode correspondence information, the combination having an incidence rate showing a value which is larger than a predetermined threshold value is extracted as the effective combination.

3. The scalable video encoding method according to claim 1, wherein,
  in the step to create the prediction mode correspondence information, the combination having the incidence rate showing the largest value from among the combinations of optimum prediction modes having the same optimum prediction modes in the lower layer is extracted as the effective combination, or alternatively, a combination of a predetermined number of optimum prediction modes selected in sequence from the incidence rate showing the largest value is extracted as the effective combination.

4. A scalable video encoding apparatus that scalably encodes videos, comprising:
  a correspondence table creating unit that, based on information about an optimum prediction mode that was selected in scalable encoding performed without any limits being placed on the usage of prediction modes defined as being able to be used, determines incidence rates of combinations of optimum prediction modes to be selected for spatially corresponding blocks of an upper layer and a lower layer, and creates a correspondence table that describes relationships between combinations of the selected optimum prediction mode and the optimum prediction mode to be selected, and the incidence rates;
  a prediction mode correspondence information creating unit that, based on the values of the incidence rates, extracts a combination of effective optimum prediction modes by narrowing down the combinations of the selected optimum prediction modes described in the correspondence table and the optimum prediction mode to be selected, and creates prediction mode correspondence information that describes the combinations of the extracted effective optimum prediction modes;
  an acquiring unit that, when encoding the upper layer block, acquires information about the optimum prediction mode selected in the encoding of the spatially corresponding lower layer block; and
  a deciding unit that, by referring to the prediction mode correspondence information using as a key the information about the selected optimum prediction mode acquired by the acquiring unit, the prediction mode search candidate to be searched in the encoding of the upper layer block is decided.

5. A computer readable recording medium which stores a scalable video encoding program that is used to execute on a computer the scalable video encoding method described in claim 1.

6. The scalable video encoding method according to claim 1, wherein
  there is provided a step in which control is performed such that scalable encoding in which limits are placed on the usage of prediction modes executed using the correspondence table, and scalable encoding in which no limits are placed on the usage of prediction modes executed without using the correspondence table are repeated alternatingly.

7. The scalable video encoding apparatus according to claim 4, comprising
  a control unit that performs control such that scalable encoding in which limits are placed on the usage of prediction modes executed using the correspondence table, and scalable encoding in which no limits are placed on the usage of prediction modes executed without using the correspondence table are repeated alternatingly.

* * * * *